US006430318B1

(12) United States Patent
Florent et al.

(10) Patent No.: US 6,430,318 B1
(45) Date of Patent: Aug. 6, 2002

(54) IMAGE PROCESSING METHOD INCLUDING SPATIAL AND TEMPORAL NOISE FILTERING STEPS, AND MEDICAL IMAGING APPARATUS FOR CARRYING OUT THIS METHOD

(75) Inventors: Raoul Florent, Valenton; Christel Soyer, deceased, late of Paris, both of (FR), by François R. G. Charpail, legal representative

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/217,431

(22) Filed: Dec. 21, 1998

(30) Foreign Application Priority Data

Dec. 23, 1997 (FR) ............................................ 97 16310

(51) Int. Cl.[7] .................................................. G01V 1/36
(52) U.S. Cl. ...................................... 382/260; 382/236
(58) Field of Search ................................ 382/260–269, 382/236, 128, 132, 275

(56) References Cited

U.S. PATENT DOCUMENTS

| | | | | | |
|---|---|---|---|---|---|
| 4,992,995 A | * | 2/1991 | Favret | .......................... | 367/73 |
| 5,068,799 A | * | 11/1991 | Jarrett, Jr. | .................... | 364/507 |
| 5,793,702 A | * | 8/1998 | Paffenholz | ................... | 367/24 |
| 5,970,180 A | * | 10/1999 | Niihara et al. | ............. | 348/14.04 |

FOREIGN PATENT DOCUMENTS

JP          01183980       *   7/1989

OTHER PUBLICATIONS

Aufrichtig R et al: "X–Ray Fluoroscopy Spatio–Temoral Filtering With Object Detection", IEEE Transactions on Medical Imaging, vol. 14, No. 4, Dec. 1, 1995, pp. 733–746.*
Brailean J C et al: "Simultaneous Recursive Displacement Estimation and Restoration of Noisy–Blurred Image Sequences", IEEE Transactions on Image Processing, vol. 4, No. 9, Sep. 1, 1995, pp. 1236–1251.*
"Multistage Order Statistic Filters for Image Sequence Processing" by Gonzalo R. Arce, IEEE Transactions on Signal Processing, vol. 39, No. 5, May 1991.

* cited by examiner

Primary Examiner—Thomas D. Lee
Assistant Examiner—Stephen Brinich
(74) Attorney, Agent, or Firm—John Vodopia

(57) ABSTRACT

The invention relates to an image processing method for reducing the noise in an image, including determination of three noisy temporal intensities relating to a current pixel in three successive images in a sequence, the image to be processed being the central image of the sequence. The method includes spatial and temporal filtering means (10, 20) which combine inputs (1, 2, 3) of temporal intensities, inputs (4, 5, 7) of spatial intensities, and at least one input (6) of a spatial and temporal and random intensity in order to supply the filtered intensity (40) for the current pixel of the processed image ($J_t$). The method involves a pseudo-temporal branch (10) which combines temporal inputs (1, 2, 3) with a spatial input (7) and, connected in parallel, a pseudo-spatial branch (20) which combines spatial inputs (1, 4, 5) with a temporal and recursive random input (6), the results (8, 9) of the two parallel branches being combined (140).

14 Claims, 5 Drawing Sheets

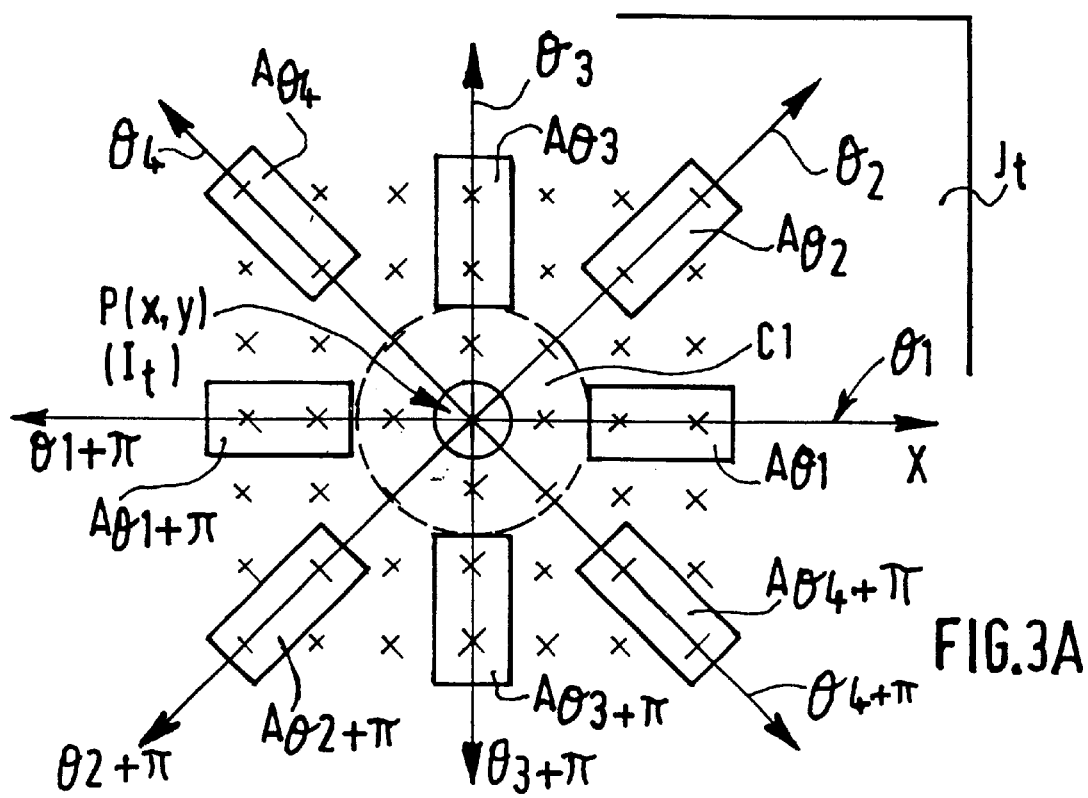
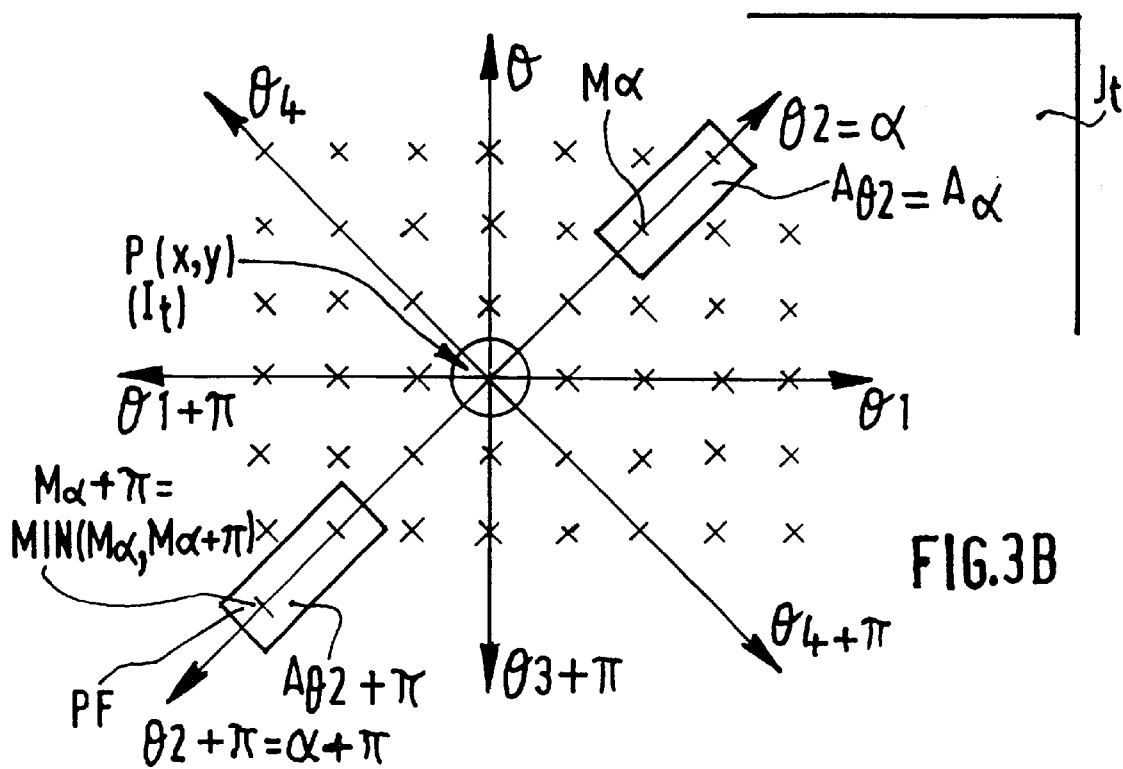

IMAGE PROCESSING METHOD INCLUDING SPATIAL AND TEMPORAL NOISE FILTERING STEPS, AND MEDICAL IMAGING APPARATUS FOR CARRYING OUT THIS METHOD

Image processing method including spatial and temporal noise filtering steps, and medical imaging apparatus for carrying out this method.

FIELD OF THE INVENTION

The invention relates to an image processing method for reducing the noise in an image, including determination of three temporal intensities relating to a current pixel in the same location in three successive images in a sequence, the image to be processed being the central image of the sequence, which method includes spatial and temporal filtering steps. The invention also relates to a medical apparatus for carrying out this method.

The method is applied in order to reduce the noise in a sequence of images while preserving the small objects in motion. In this context small objects are to be understood to mean objects from 1 to a few pixels, for example from 1 to 10 pixels. The invention can be used particularly for the processing of video images, notably medical images.

BACKGROUND OF THE INVENTION

An image processing method for reducing the noise in a sequence of images which includes spatial and temporal filtering is already known from the publication "Multistage Order Statistic Filters for Image Sequence Processing" by Gonzalo R. ARCE, IEEE Transactions on SIGNAL PROCESSING, Vol.39, No. 5, MAY 91.

The cited document describes a median filtering method with several so-called MOS levels which combines the outputs of elementary spatial filters which operate in a cascade-type filtering structure comprising several levels. These elementary filters are conceived to match the structure extending in the window of the filter. In a spatial and temporal signal space each elementary filter is conceived to preserve a feature having substantially identical grey levels in a given direction (dimension). When a sufficiently large number of elementary filters is used, a feature oriented in any arbitrary direction can be preserved by the filter. The type of feature to be preserved determines the type of elementary filter of the MOS. If the feature is a unidirectional segment in a three-dimensional spatial and temporal space (cube), the filter MOS is called a unidirectional multi-level filter because of the fact that the elementary filter is unidirectional. If the feature has segments extending in two orthogonal directions, i.e. one in space and the other in time, the elementary filter is bi-directional and the resultant filter MOS is called a bi-directional multi-level filter. In an alternative version, a generalization of the class of filters described above is obtained by providing a degree of smoothing control by variation of the weight at the center of the window of the filter.

According to the cited document, these filters MOS are conceived to enable the restoration of details of the order of a pixel when the images of the sequence are free from motions causing an object to be displaced from one image to another. The filters MOS preserve the structure of the signal without taking into account motions of the object. The robustness with respect to noise, therefore, is dependent on the amplitude of the motions in the sequence.

SUMMARY OF THE INVENTION

It is an object of the invention to provide an image processing method for reducing the noise in a sequence of images representing small objects in motion while avoiding the formation of noise patches and patterns which are generally caused by spatial filtering of the current image in such an image sequence.

It is also an object of the invention to provide a method which avoids the dilemma between the elimination of noise patterns, which involves problems as regards preservation of objects in motion, and the preservation of objects in motion, involving problems in respect of residual noise patterns.

This object is achieved and the described problem is solved by means of an image processing method for reducing the noise in an image as claimed in claim 1.

It is an advantage of this filtering method that it can be applied in circumstances in which the sequence of images contains very small objects which undergo very large motions. Generally speaking, this filtering method can operate in particularly difficult circumstances in respect of motion of the objects in the sequence of images. For example, this filtering method can be used in an image processing system which is included in a medical X-ray imaging apparatus operating in the fluoroscopy mode in which a sequence of images comprises only from 2 to 3 images per second, in which the images are extremely noisy because of the very low X-ray dose used for their formation, in which the movements of the objects from one image to another in the sequence are very large because of the comparatively long period of time elapsing between the formation of two successive images, and in which the objects in motion are also tools, such as catheters, which are extremely small. Even in these extremely difficult circumstances, very good results are obtained by means of this method. Thus, the method is capable of extracting the noise from a sequence of fluoroscopic images in the very difficult circumstances described above in such a manner that these noise-suppressed images correspond to images which would require an X-ray exposure time amounting to four times that of the images to be processed.

It is another advantage of the method that it does not require a priori knowledge of a variable which is called the standard noise deviation relative to the mean noise; such knowledge is necessary for carrying out many other known noise reduction methods.

It is another advantage of the method that it does not require any initial condition. It can be applied directly to a sequence of images.

A medical imaging apparatus which includes means for carrying out this method is defined in claim 10.

BRIEF DESCRIPTION OF THE DRAWINGS

The invention will be described in detail hereinafter with reference to the accompanying diagrammatic drawing; therein.

DESCRIPTION OF THE PREFERRED EMBODIMENTS

Figure 1A:
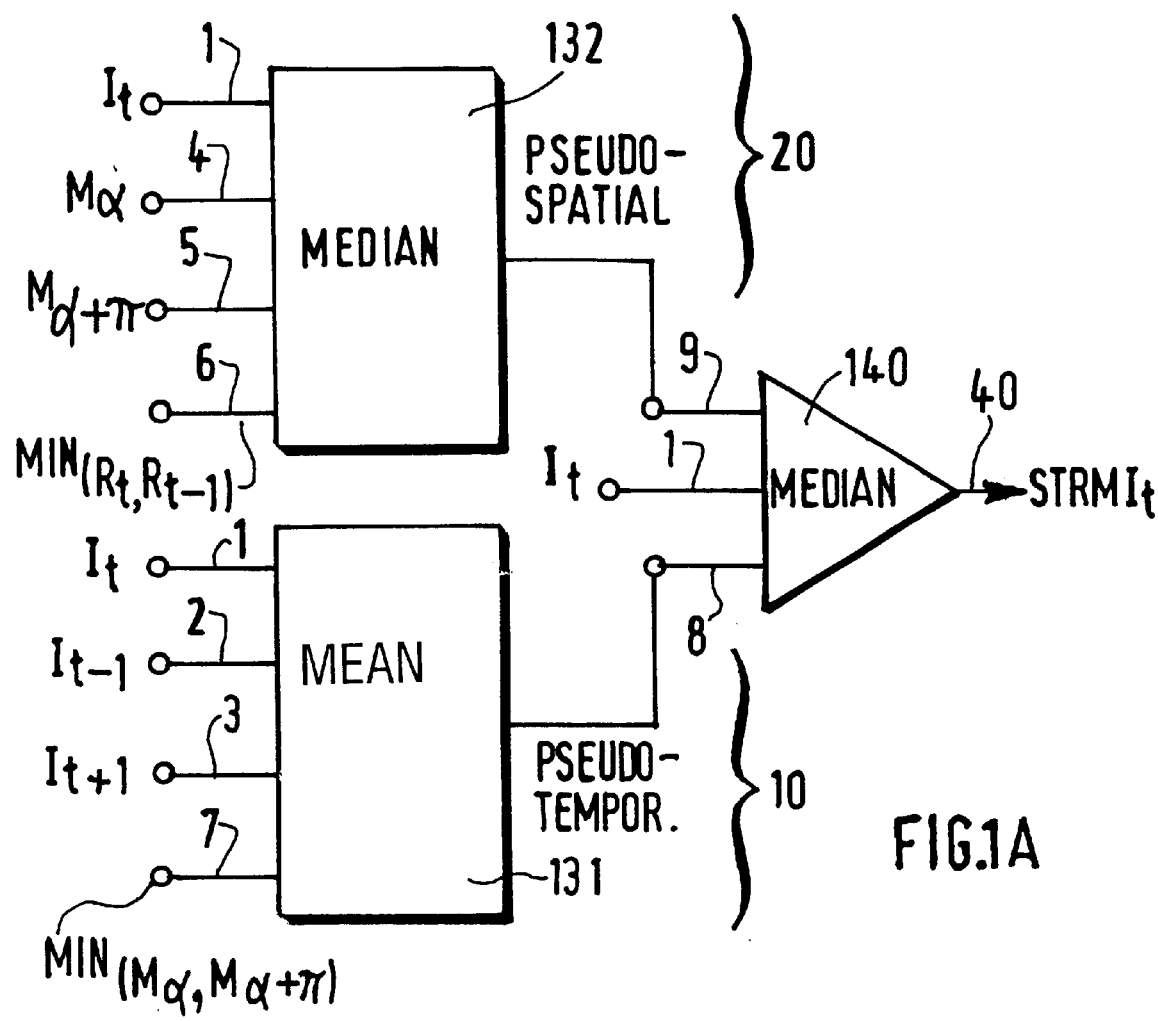
FIG. 1A shows, in the form of blocks, the functions used in the method.
Figure 1B:
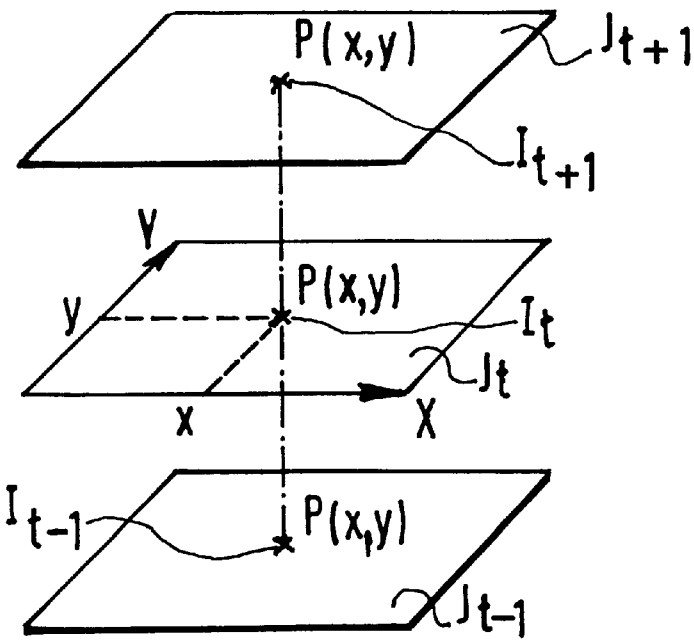
FIG. 1B illustrates the acquisition of three successive temporal images.
Figure 2:
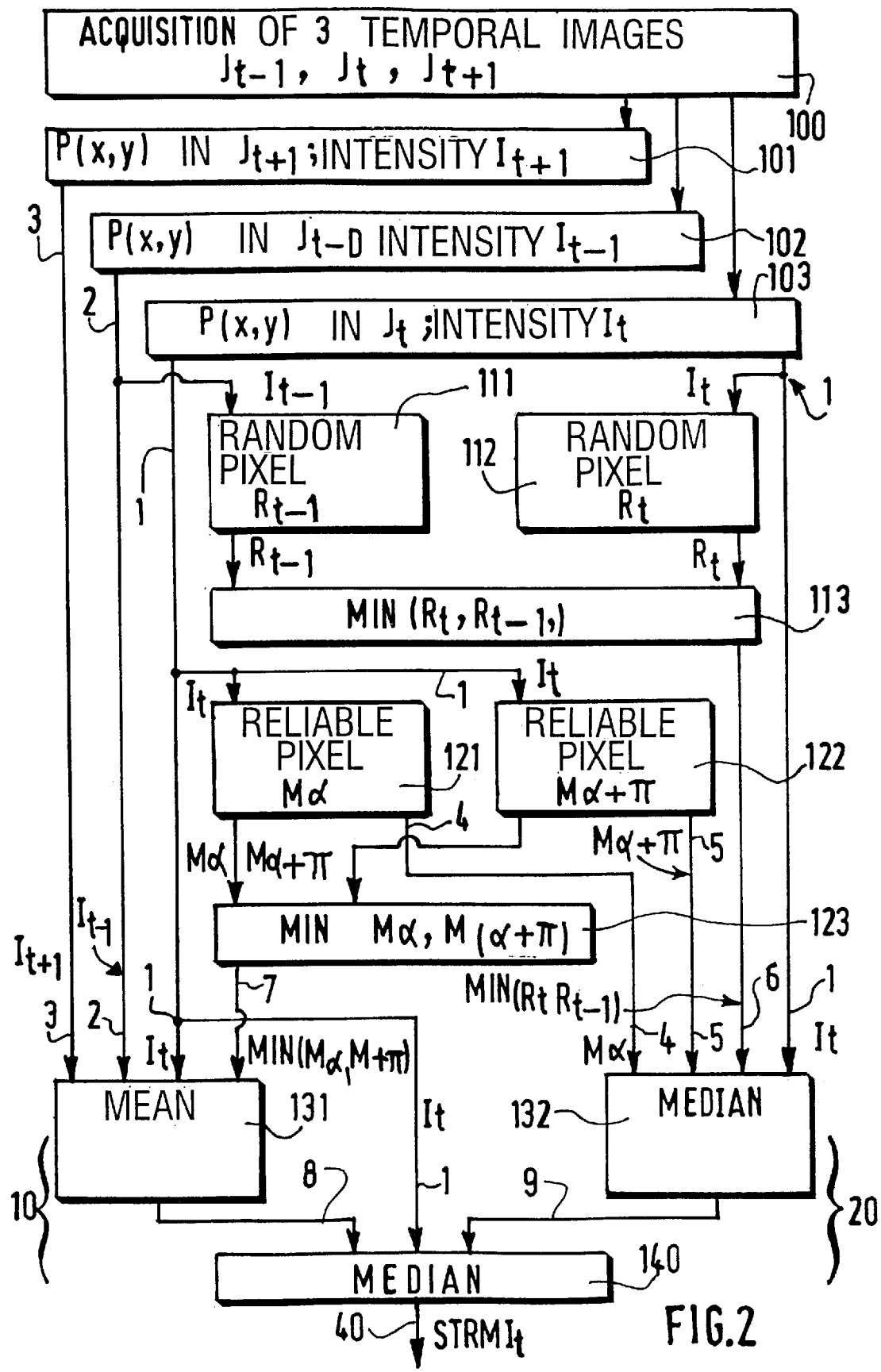
FIG. 2 shows, in the form of blocks, the succession of steps of the method in more detail in comparison with FIG. 1A, FIGS. 3A and 3B illustrate the steps for the search and the detection of reliable pixels, respectively.

FIG. 1A shows, in a simplified manner and in the form of a sequence of functional blocks, an image processing method for reducing the noise in a sequence of images, and FIG. 2 represents the same method in more detail; this method comprises 1) a step (100) for the acquisition of three successive images, referred to as $J_{t-1}$, $J_t$, $J_{t+1}$, all three of which are originally noisy and not previously smoothed in respect of noise peaks, because such smoothing is not necessary for this method which performs complete filtering of the noise itself. The images acquired are called the causal image, the present image and the anticausal image, respectively, and are shown in FIG. 1B. The present image $J_t$ is processed by the method so as to achieve a noise reduction by way of its own intensity data and the intensity data of the causal image $J_{t-1}$ and the anticausal image $J_{t+1}$. For the processing in each of these images there is considered a pixel P(x,y) which has spatial co-ordinates x,y in a system X,Y of the images and intensities $I_{t-1}(x,y)$, $I_t(x,y)$ and $I_{t+1}(x,y)$, respectively, in the causal image, the present image and the anticausal image. For the simplicity of writing, these intensities are referred to hereinafter as $I_{t-1}$, $I_t$ and $I_{t+1}$.

Referring to FIG. 1A, showing the basic functions used, the method is based on three important principles.

According to the first principle, the process is carried out while following two principal branches:

first branch 10 for substantially temporal filtering; this branch is called a pseudo-temporal branch;

a second branch 20 for substantially spatial filtering; this branch is called a pseudo-spatial branch.

According to this first principle, neither of the branches 10 or 20 provides purely temporal or purely spatial filtering. Each branch 10 or 20 provides a balanced noise suppression in the central image $J_t$ of the sequence of three successive images. The filtering method including these two branches 10 and 20 establishes a continuous transfer, in conformity with which the sequence of images contains an object in motion, or an object whose motion has disappeared, between the pseudo-spatial branch and the pseudo-temporal branch.

According to the second principle, the method comprises operations for avoiding the patches or noise patterns which would appear as the result of purely spatial filtering.

Referring to FIG. 2, according to this second principle these operations utilize a mechanism for the random selection of pixels 111, 112, 113 in the images of the sequence; this random selection mechanism is not purely spatial. Actually, such a random mechanism, if it were purely spatial, or if it were to leave noise patterns in existence or if it were to eliminate the noise patterns, would not be suitable to achieve a satisfactory noise suppression level. Occasionally, if such a mechanism were to succeed in eliminating the noise patterns while reaching a satisfactory noise suppression level, it would still leave behind noise suppression corresponding to the intensity fronts due to the motions between two images.

According to the third principle, the method is based on two types of pixels distinguished in the images of the sequence, being on the one hand so-called reliable pixels which are situated at a short distance from the current pixel P(x,y) processed in the present image $J_t$, provided by the operations 121, 122, 123, and on the other hand pixels which are not necessarily reliable pixels and which are situated in the causal image and the anticausal image, or are situated in the present image but at a longer distance from the current pixel P(x,y) than the reliable pixels, and are produced by the operations 111, 112, 113.

Referring to the FIGS. 1A and 2, for execution on the basis of these important principles the method thus includes the following steps:

2) Filtering in two parallel operations 10, 20, being:
the first pseudo-temporal branch 10,
the second pseudo-spatial branch 20,
said two operations being succeeded by a median filter 140 whose inputs receive the two outputs 8, 9 from the branches 10 and 20 and the intensity 1 of the current pixel $I_t$.

The pseudo-temporal branch 10 on the one hand has three temporal inputs 1, 2, 3 which are the intensities $I_{t-1}$, $I_t$, $I_{t+1}$, fetched from the three successive images $J_{t-1}$, $J_t$, $J_{t+1}$. On the other hand, this pseudo-temporal branch 10 has:

a spatial input 7 which is evaluated on the basis of reliable pixels.

These reliable pixels are detected by the operations 121, 122, 123 which are performed while posing the hypothesis that one wishes to detect small objects or small details, so short segments.

Referring to FIG. 3A, during this operation an analysis is made of a given number of directions, called θ, while utilizing filters with linear supports in which an average A of the intensities of the pixels on these supports is formed. There is defined a system of centered axes having directions which are marked by discretized angles θ measured with respect to a reference axis, for example the axis X of the abscissas x. The discretized angle θ takes different values which are regularly distributed in space in such a manner that $\theta_1=0$, $\theta_2=\pi/4$, $\theta_3=\pi/2$, $\theta_4=3\pi/4$. The axes situated in diametrically opposite directions are marked by the same angle notations +π in such a manner that: : $\theta_1+\pi$, $\theta_2+\pi$, $\theta_3+\pi$, $\theta_4+\pi$. In this system of axes, being centered on the current pixel P(x,y), the supports of the linear filters are arranged according to the various discretized directions called θ or θ+π.

For the detection of small details, preferably the length of the support, or masks, is chosen to be 2 pixels. Actually, the larger the support, the less the possibility of detection of very small details will be. If the size of the supports or masks is increased, for example by taking three or four aligned pixels, it will be necessary to increase the number of directions of the system of axes; the noise suppression is thus enhanced, be it that there is a risk of breaking of the details and the calculation costs are also increased. Referring to FIG. 3A, the masks are arranged at some distance from the central pixel, thus enabling a decrease of the spatial correlation of the noise so that a better noise suppression can be achieved. For example, a ring of 1 pixel is left. Thus, the short distance for the detection of reliable pixels is 2 or 3 pixels with respect to the central pixel.

The operation for the detection of reliable pixels is performed on the present image $J_t$. This operation includes a selection of a specific direction which is marked by an angle value α from among the various angles θ and θ+π of the system of axes. This specific direction is selected in such a manner that the mean intensity level calculated across the mask of the support of the linear filter arranged in this direction α is as near as possible to the intensity level $I_t$ of the current pixel P(x,y).

To this end, the mean intensity $A_\theta$ is evaluated in all masks of the filter supports arranged in all directions θ of the system of axes. Subsequently, the specific direction is determined which corresponds to an angle θ for which the following expression is minimum when θ varies:

$$|[(A_\theta + A_{\theta+\pi})/2] - I_t| \quad (1)$$

and α is called the corresponding specific angle θ. The specific values of the averages $A_\theta$ and $A_{\theta+\pi}$, which are formed in the supports of the linear filters and minimize the above expression (1) are called average $A_\alpha$ and average $A_{\alpha+\pi}$.

Referring to FIG. 3B, after determination of a direction α in this manner, operations 121 and 122 are performed so as to select two reliable pixels, i.e. one pixel in each of the supports corresponding to these averages. The first reliable pixel, selected by the operation 121, is that which has the minimum intensity, called $M_\alpha$, in the filter support situated in the direction α, and the second reliable pixel, selected by the operation 122, is that which has the minimum intensity, called $M_{\alpha+\pi}$, in the filter support situated in the opposite direction α+π.

The method also includes a supplementary selection which is carried out by an operation 123 which determines the pixel whose intensity is minimum from among the two previously selected reliable pixels; this minimum intensity is called $MIN(M_\alpha, M_{\alpha+\pi})$.

The selection of the reliable pixels from among the pixels of minimum intensity is justified by the fact that in the majority of applications of the present method the objects are reproduced in dark on a bright background. This is so for applications in medical imaging, radiography, fluoroscopy etc. In these applications the aim is to preserve small objects which are always dark. It follows that a reliable pixel is dark. In case the image to be processed shows bright objects on a dark background, the reliable pixels are determined from among the pixels of maximum intensity. In the case of television applications, evidently it will not be necessary to search the reliable pixels or points from among the darkest pixels or points. In that case simply the pixels or points are searched whose intensity is nearest to that of the current pixel or point.

Referring to the FIGS. 1A and 2, the pseudo-temporal branch 10 includes a mean operator 131 which combines, at the inputs, the three temporal intensities $I_{t-1}, I_t, I_{t+1}$, referred to as 1, 2, 3, and the spatial intensity $MIN(M_{60}, M_{\alpha+\pi})$ which is referred to as 7.

This operation is analyzed as described hereinafter.

Figure 4A:
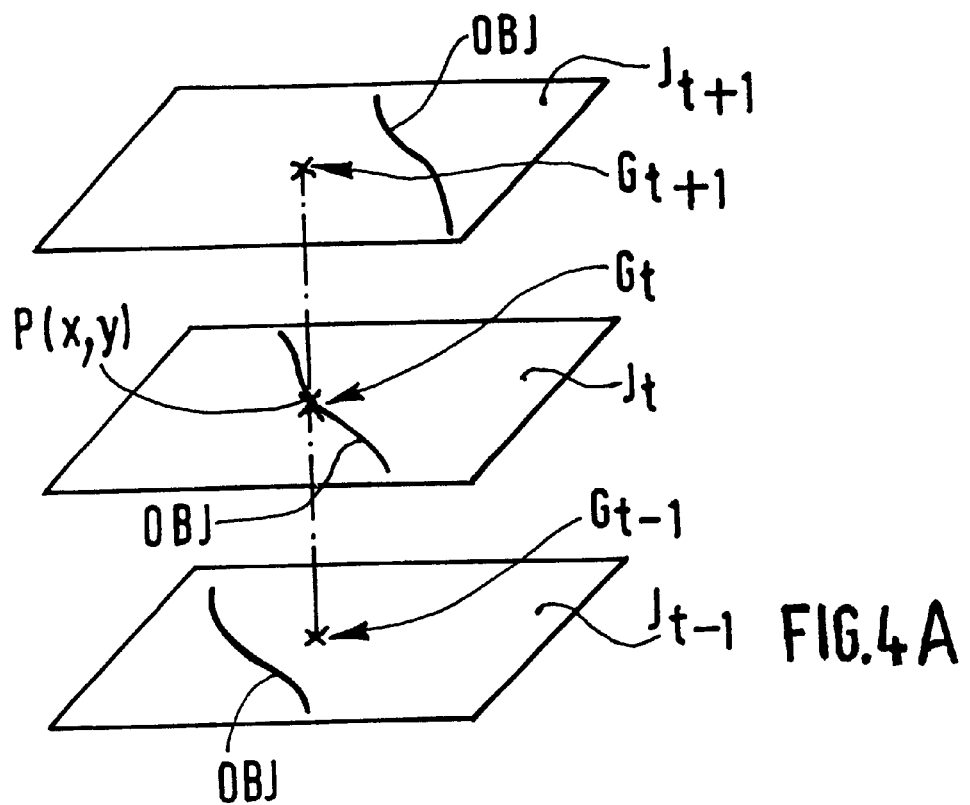
FIGS. 4A and 4B illustrate situations in which the sequence represents a small object in motion and an object in the form of a plateau in motion, respectively.

Referring to FIG. 4A, showing the motion of a small object OBJ, present in the images, between $J_{t-1}$ and $J_{t+1}$; if there no movement of the object OBJ occurs between the three successive input images $J_{t-1}, J_t, J_{t+1}$, on the one hand the three temporal inputs 1, 2, 3 formed by the intensities $I_{t-1}, I_t, I_{t+1}$, are called "correct" because all three have practically the same value and this value is substantially that of the current pixel $I_t$. On the other hand, the input 7, formed by the spatial intensity $MIN(M_\alpha, M_{\alpha+\pi})$ of the reliable pixel, is always "correct" in conformity with the principle of selection of the reliable pixel. The previously detected reliable pixels have been declared reliable because they are situated in a direction α in which the intensity is compatible with the intensity $I_t$ of the current pixel to be processed.

The foregoing can be summarized as follows: the pseudo-temporal branch 10 processes three pixels of temporal origin, which are derived from the temporal images $J_{t-1}, J_t, J_{t+1}$, and a so-called reliable pixel which is derived by purely spatial detection 121, 122, 123. In the absence of motion, the pseudo-temporal branch 10 thus provides a suitable noise suppression and a suitable temporal integration.

Figure 4B:
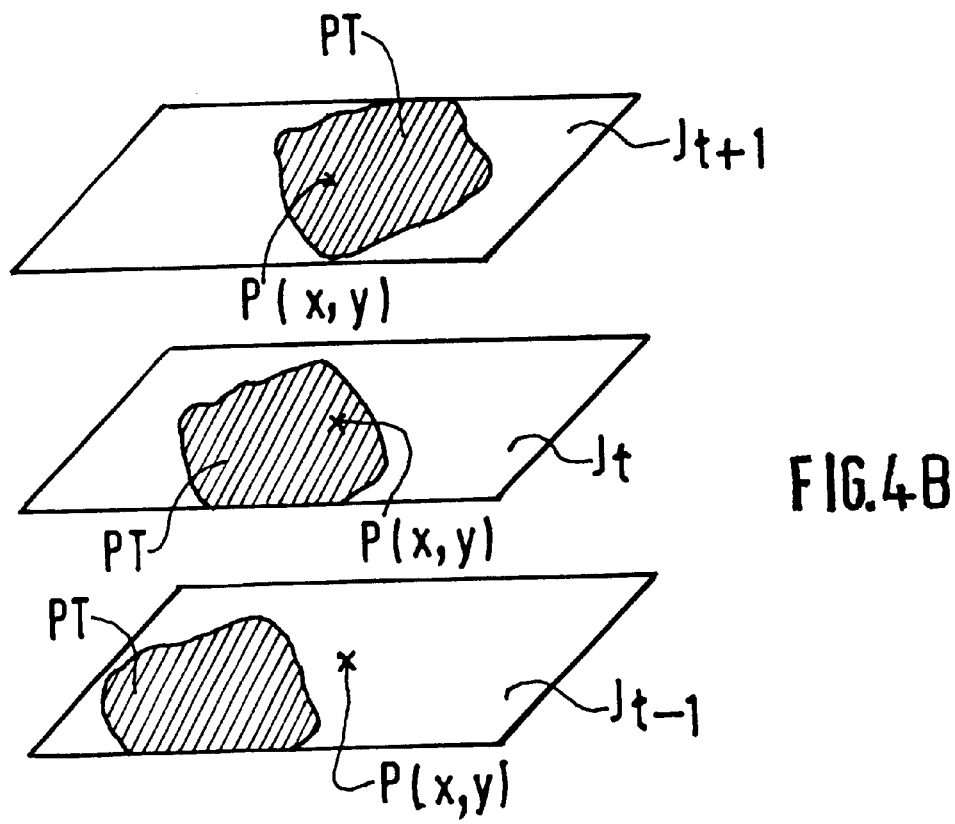

Referring to FIG. 4B, if a motion of the object OBJ occurs between the three successive images $J_{t-1}, J_t, J_{t+1}$ and if a so-called "plateau motion" is concerned, either the intensity $I_{t-1}$ or the intensity $I_{t+1}$ will clearly deviate from the intensity $I_t$ of the current pixel. It is said that the corresponding temporal input 2 or 3 of the pseudo-temporal branch is "false". The other three inputs are "correct" and the result of the mean operator presents a small distortion which is caused by the fact that only 75% of the inputs are valid.

Referring to FIG. 4A, if a motion of the object OBJ occurs between the three successive images $J_{t-1}, J_t, J_{t+1}$ and if a furtive motion (passing-by movement) of a small object is concerned, it may occur that at the same time the intensity $I_{t-1}$ and the intensity $I_{t+1}$ clearly deviate from the intensity $I_t$ of the current pixel. The two corresponding temporal inputs 2 and 3 of the pseudo-temporal branch 10 are "false". Only two inputs 1 and 7 of the branch 10 are "correct". It follows that in this case the result of the mean operator 131 is not reliable because only 50% of the inputs are valid.

These faults will be corrected by the pseudo-spatial branch 20.

Referring to the FIGS. 1A and 2, the pseudo-spatial branch 20 first of all comprises three reliable spatial inputs 1, 4 and 5, being the intensity $I_t$ of the current pixel, the intensity $M_\alpha$ of the reliable pixel in the direction α, and the intensity $M_{\alpha+\pi}$ of the reliable pixel in the opposite direction α+π.

However, a person skilled in the art will know that a purely spatial filter is liable to produce noise patches and noise patterns. Therefore, according to the present method this risk is eliminated by supplying the pseudo-spatial branch with a fourth input 6 which is not purely spatial.

Figure 5:
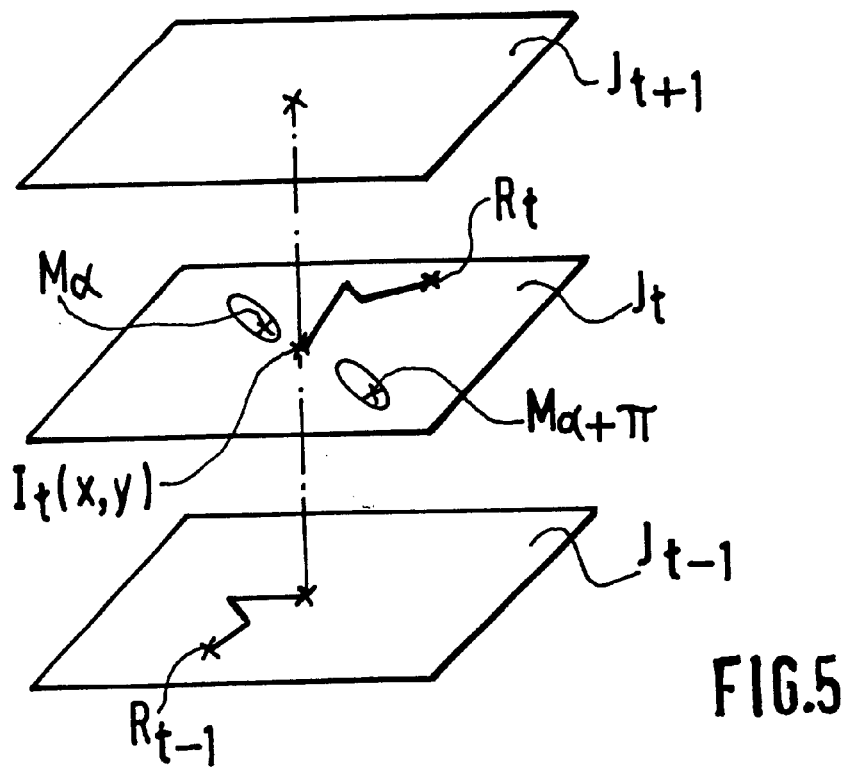
FIG. 5 illustrates the determination of random pixels.

Referring to FIG. 5, the formation of this input 6 is based on a random selection mechanism; it also is of a recursive nature. This fourth input 6 is called $R_t$, being the intensity of a pixel chosen at random around the current pixel P(x,y) in the present image $J_t$. The term "around the current pixel" is to be understood to mean that $R_t$ is the intensity of a pixel chosen in a neighborhood $V_t$ around the current pixel. The neighborhood may have a square shape with a dimension of 6 or 8 pixels to both sides of the current pixel, said current pixel being excluded from the neighborhood $V_t$. Because of the size of the neighborhood chosen, the random pixel will be situated further from the central pixel than the reliable pixels. Generally speaking, the intensity $R_t$ is that of a random pixel in the neighborhood $V_t$, but not that of a reliable pixel.

For this reason a temporal notion is introduced and applied to $R_t$ and also a recursive notion.

According to the present method, a value $R_{t-1}$ has already been evaluated in relation to the causal image $J_{t-1}$. Referring to FIG. 2, therefore, at the arrival of the image $J_t$ random values $R_{t-1}$ and $R_t$ are retained according to the above principle by means of the operations 111 and 112, respectively. Subsequently, as the fourth input 6 for the pseudo-spatial branch 20 the intensity 6, which is written as:

$$MIN|R_{t-1}, R_t| \quad (2)$$

is chosen in an operation 113. If the image contains bright objects on a dark background, a MAX replaces the MIN in the formula (2).

The choice of a random pixel of temporal origin in order to provide the fourth input 6 for the pseudo-spatial branch 20 is justified by the fact that the fault of the pseudo-temporal branch 10 occurs in the case of a furtive or passing-by motion of a small object OBJ. This fault cannot be compensated by the use of an input formed by the intensity of a pixel near the central pixel, because it is known that the intensity of such a pixel is very different in the present image being processed by the pseudo-spatial branch. This fault can be compensated only by the intensity of a pixel situated far from the current pixel, be it within the confines of a neighborhood of average size, and occasionally in an image other than the present image, that is to say in the anticausal image in which there is a greater probability of encountering the small moving object OBJ.

The four inputs 1, 4, 5 and 6 of the pseudo-spatial branch 20 are thus formed by the three spatial intensities $I_t$, $M_\alpha$, $M_{\alpha+\pi}$ of reliable pixels and by an intensity $MIN(R_{t-1}, R_t)$ of a pixel which is situated in a random location and has a temporal and recursive nature. These four intensity values, three of which are always correct, are applied to the inputs of a median filter 132 which comprises four inputs. Under the influence of the median filter 132, the four intensities presented are classified according to value and the two intensities of intermediate value are averaged. The median filter 132 supplies, at the output 9, the intensity value which is situated between two other remaining intensities. The median filter 132 has the property that it eliminates the atypical values and that it outputs the median value as its result; this means that a false input among the three inputs applied to the median filter is automatically eliminated and cannot participate in the result. Therefore, the result of the median filter of the pseudo-spatial branch 20 is 100% correct. Supposing that the result is not as correct as possible but lies some distance from the best intensity, it will nevertheless participate in the elimination of noise patches and patterns from the image.

3) Operation for combination by an output median filter 140.

Referring to the FIGS. 1A and 2, the outputs 8 and 9 of the pseudo temporal branch 10, of the pseudo-spatial branch 20, and the intensity $I_t$, referred to as 1, of the current pixel in the present image $J_t$ are applied to the three inputs of a median filter 140 which is called the output median filter.

Two of these three inputs 1, 8 and 9 are always correct, that is to say:

the input 1, being the intensity $I_t$ of the current pixel;
the input 9, being the output of the pseudo-spatial branch 20.

As a result, the output 40, referred to as $STRMI_t$, of the output median filter 140 is always 100% correct because of the properties of median filters.

The present method is automatically carried out correctly by way of a standard and systematic scanning of the noisy original image, each pixel being subjected to all steps of the method. For example, the image can be scanned from left to right and from top to bottom as will be known to those skilled in the art. Each pixel being processed is called the current pixel.

The present method essentially comprises a determination of three temporal intensities relating to a current pixel in the same location in three successive images of a sequence, the image to be processed being the central image of the sequence, and includes filtering steps for providing the current pixel of the processed image ($J_t$) with a filtered intensity (40) by means of spatial and temporal processing means (10, 20) which combine inputs (1, 2, 3) of intensities of a temporal nature, inputs (4, 5, 7) of intensities of a spatial nature, and at least one input (6) of an intensity of a spatial, temporal and random nature.

Generally speaking, the present method thus involves a pseudo-spatial processing branch 20 in parallel with a pseudo-temporal processing branch 10 and means 140 for combining the results 8 and 9 of these branches.

The pseudo-temporal branch 10 includes means 131 for combining on the one hand a majority of inputs 1, 2, 3, being intensities selected on the temporal axis t−1, t, t+1 considered for the current pixel having the co-ordinates x,y, and a minority of inputs 7, being the intensities of reliable pixels which are supplied by the means 121, 122, 123 for the selection of reliable pixels in the present image.

The pseudo-spatial branch 20 includes means 132 for combining a majority of inputs 1, 4, 5, being intensities of reliable pixels supplied by the means for the selection of reliable pixels in the present image, and a minority of inputs 6, being intensities of pixels obtained by a mechanism 111, 112, 113 for the random selection with a temporal and recursive nature.

The means for the selection of reliable pixels have been described merely by way of example. Many other means for the selection of reliable pixels or points will be known to those skilled in the art. Reliable pixels may be selected, for example by applying a threshold to the intensity levels of pixels in a neighborhood of the current pixel in the present image and by declaring reliable pixels to be those pixels whose intensity is nearest to that of the current pixel within the threshold limit.

Thus, the selection of reliable pixels can be performed by selection of pixels at a short distance, in a mask or a neighborhood, which appear to belong most to the same object on the basis of a given probability criterion, for example based on the proximity of intensity levels.

The present method can be carried out by means of a simple system. A system of this kind includes only the means for the selection of reliable pixels and random pixels of a recursive nature, and three combination means, preferably a MEDIAN-4 filter in the pseudo-spatial branch, a 4-input mean operator in the pseudo-temporal branch, and a median filter for the combination of the outputs of the pseudo-spatial and pseudo-temporal branches.

The spatial combination can be performed by a mean operator, a linear combination operator etc. instead of using a median filter.

Figure 6:
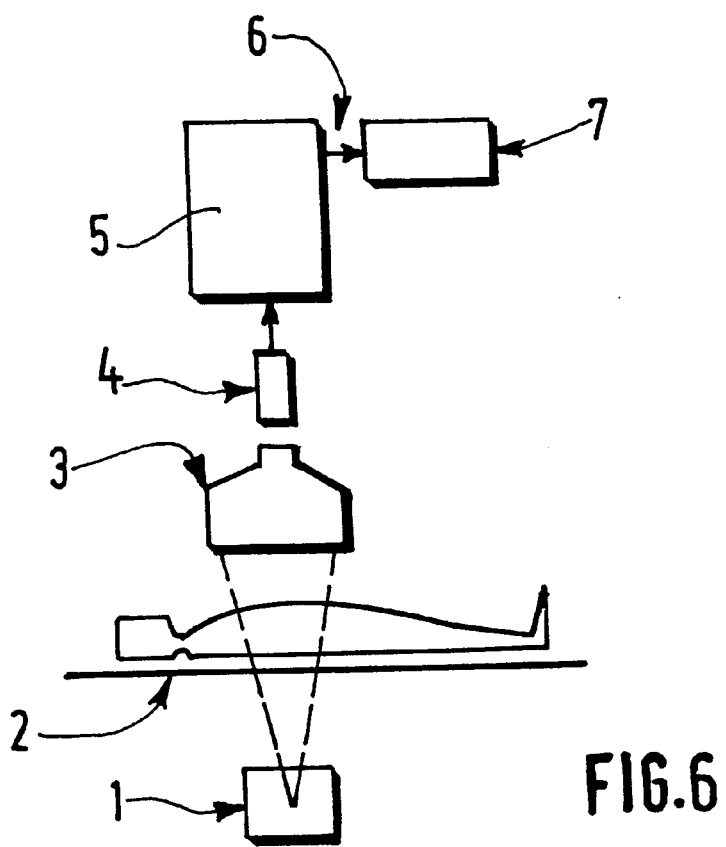
FIG. 6 shows a medical X-ray apparatus which includes means for the processing of digital images.

FIG. 6 shows, by way of example, a medical imaging apparatus which includes a digital radiography system provided with means for carrying out the described noise reduction method. The apparatus includes an X-ray source 1, a table 2 for accommodating the patient, a device for receiving X-rays having traversed the patient, and notably an image intensifier device 3 which is coupled to a camera tube 4 which applies data to an image processing system 5 which includes a microprocessor. The latter has a plurality of outputs, one output 6 of which is coupled to a monitor 7 for the display of images, or sequences of images, processed or to be processed.

The digital radiographic image may contain 512×512 or 1024×1024 pixels encoded in 8 bits or 10 bits. Each pixel can thus be assigned one from 256 or 1024 intensity levels. For example, the dark regions have a low intensity level and the bright regions of the image have a high intensity level.

The digital image can be acquired in the fluoroscopy mode. The invention can be used particularly for the processing of arteriographic images.

The various steps and operations of the described digital image processing method are carried out in the system 5. The data can be stored in a memory zone (not shown). Recording means (not shown) may also be used.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An image processing method which includes temporal and spatial filtering for reducing the noise in an image ($J_t$) comprising:
   determination of three temporal intensities ($I_{t-1}$, $I_t$, $I_{t+1}$) relating to a current pixel ($P(x,y)$) in the same location in three successive images ($J_{t-1}$, $J_t$, $J_{t+1}$) in a sequence,
   determination of three spatial intensities ($M_\alpha$, $M_{\alpha+\pi}$, $MIN(M_\alpha, M_{\alpha+\pi})$);
   determination of two random pixel intensities $R_{t-1}$, $R_t$; and
   spatial and temporal filtering which includes combining (i) inputs of said temporal intensities, (ii) inputs of said spatial intensities, and (iii) at least one input of a spatial and temporal and random intensity to provide a filtered intensity for the current pixel of the processed image ($J_t$).

2. A medical imaging apparatus comprising
   means for the acquisition of a sequence of digital images,
   means for processing of images which has access to the image data of the acquisition system, and which carries out a method which includes temporal and spatial filtering for reducing the noise in an image ($J_t$) comprising:
   determination of three temporal intensities ($I_{t-1}$, $I_t$, $I_{t+1}$) relating to a current pixel $P(x,y)$ in the same location in three successive images ($J_{t-1}$, $J_t$, $J_{t+1}$) in a sequence,
   determination of three spatial intensities ($M_\alpha$, $M_{\alpha+\pi}$, $MIN(M_\alpha, M_{\alpha+\pi})$);
   determination of two random pixels ($R_{t-1}$, $R_t$); and
   spatial and temporal filtering which includes combining (i) inputs of said temporal intensities, (ii) inputs of said spatial intensities, and (iii) at least one input of a spatial and temporal and random intensity to provide a filtered intensity for the current pixel of the processed image ($J_t$), and a display system.

3. A method as claimed in claim 2 wherein the majority of inputs in the pseudo-temporal branch are said temporal intensities ($I_{t-1}$, $I_t$, $I_{t+1}$) selected on a temporal axis (t−1, t, t+1) of the images in the sequence, considered at the current pixel ($P(x,y)$), and the minority of inputs are spatial intensities [$MIN(M_\alpha, M_{\alpha+\pi})$] which are substantially near to that of the current pixel ($P(x,y)$), which are called reliable, and which are spatially selected in the image ($J_t$) to be processed, and
   wherein the majority of inputs in the pseudo-spatial branch are temporal and spatial intensities ($I_t$, $M_\alpha$, $M_{\alpha+\pi}$) which are substantially near to that of the current pixel ($P(x,y)$), which are called reliable, and which are spatially selected in the image ($J_t$) to be processed, and the minority of inputs are intensities of pixels selected in the image preceding the image to be processed and in the image to be processed ($J_{t-1}$, $J_t$) of a mechanism of a random and recursive nature.

4. A method as claimed in claim 3 wherein the pseudo-temporal branch forms the combination of its inputs by means of a mean operator,
   wherein the pseudo-spatial branch forms the combination of its inputs by means of a median filter, and the outputs of the two branches are combined by means of a median filter whose output supplies a filtered intensity ($STRMI_t$) to be attributed to the current pixel ($P(x,y)$).

5. A method as claimed in claim 3 wherein, in case objects are represented as dark objects on a bright background in the images, the mechanism of a random and recursive nature in the pseudo-spatial branch for performing the temporal selection of minority intensities comprises:
   determination of a neighborhood ($V_t$) around the current pixel in the image ($J_t$) to be processed, excluding the current pixel($P(x,y)$), while taking into account the fact that a neighborhood has already been determined in the preceding image ($J_{t-1}$) during the processing of said preceding image,
   determination of a random pixel in the neighborhood of the temporal image to be processed, taking into account the fact that a random pixel has already been determined in the preceding image ($J_{t-1}$) during the processing of said preceding image, determination of the intensities ($MIN(R_{t-1}, R_t)$) of the two random pixels, and
   wherein, in case the objects are represented as bright objects on a dark background, the mechanism comprises the execution of the same determination steps while selecting the highest intensities instead of the lowest intensities in the selection step.

6. A method as claimed in claim 5 wherein, in case the objects are represented as dark objects on a bright background in the images, the spatial selection of reliable minority intensities in the image ($I_t$) to be processed in the pseudo-temporal branch comprises:
   definition of linear filter supports which are arranged along axes which are distributed in a discretized manner and are centered on the current pixel,
   determination, in two diametrically opposed filter supports of two pixels which are called reliable pixels, there being one pixel per support, and which have the lowest intensities ($M_\alpha$, $M_{\alpha+\pi}$),
   determination, from among these two intensities ($M_\alpha$, $M_{\alpha+\pi}$) of the intensity which is the lowest ($MIN(M_\alpha, M_{\alpha+\pi})$), and
   selection of the latter intensity as the spatial input for the pseudo-temporal branch, and
   wherein in case the objects are represented as bright objects on a dark background, the spatial selection comprises execution of the same determination steps while selecting the highest intensities instead of the lowest intensities in the selection step.

7. A method as claimed in claim 6 wherein the random pixels are selected to be situated at a greater spatial distance from the current pixel than the reliable pixels.

8. A method as claimed in claim 7 wherein the linear filter supports consist of two pixels which are separated from the current pixel by a ring of 1 pixel, wherein the axes are distributed in a discretized manner by forming angles of $\pi/4$ therebetween, and wherein the neighborhoods ($V_t$) are from ±6 pixels to ±8 pixels.

9. A method as claimed in claim 1 further comprising scanning the images in an automatic and standard fashion, one pixel after the other, and wherein the steps of determination and of spatial and temporal filtering are executed automatically for each pixel.

10. The method of claim 4 wherein, in case objects are represented as dark objects on a bright background in the images, the mechanism of a random and recursive nature in the pseudo-spatial branch for performing the temporal selection of minority intensities comprises:
    determination of a neighborhood ($V_t$) around the current pixel in the image ($J_t$) to be processed, excluding the current pixel ($P(x,y)$), while taking into account the fact that a neighborhood has already been determined in the preceding image ($J_{t-1}$) during the processing of said preceding image, determination of a random pixel in the neighborhood of the temporal image to be processed, taking into account the fact that a random pixel has already been determined in the preceding image ($J_{t-1}$) during the processing of said preceding image, determination of the intensities ($R_{t-1}$, $R_t$) which correspond to the two random pixels fetched from the preceding image and in the image to be processed, selection from among these two intensities, of the lowest intensity ($MIN(R_{t-1}, R_t)$) of the two random pixels, and, wherein, in case the objects are represented as bright objects on a dark background, the mechanism comprises the execution of the same determination steps while selecting the highest intensities instead of the lowest intensities in the selection step.

11. The method of claim 10, wherein, in case objects are represented as dark objects on a bright background in the images, the spatial selection of reliable minority intensities in the image ($I_t$) to be processed in the pseudo-temporal branch comprises:

definition of linear filter supports which are arranged along axes which are distributed in a discretized manner and are centered on the current pixel, determination, in two diametrically opposed filter supports of two pixels which are called reliable pixels, there being one pixel per support, and which have the lowest intensities ($M_\alpha$, $M_{\alpha+\pi}$), of the intensity which is the lowest ($MIN(M_\alpha, M_{\alpha+\pi})$), and selection of the latter intensity as the spatial input for the pseudo-temporal branch, and wherein, in case the objects are represented as bright objects on a dark background, the spatial selection comprises execution of the same determination steps while selecting the highest intensities instead of the lowest intensities in the selection step.

12. A method as claimed in claim 6 wherein the random pixels are selected to be situated at a greater spatial distance from the current pixel than the reliable pixels.

13. A method as claimed in claim 7 wherein the linear filter supports consist of two pixels which are separated from the current pixel by a ring of 1 pixel, wherein the axes are distributed in a discretized manner by forming angles of $\pi/4$ therebetween, and wherein the neighborhoods ($V_t$) are from ±6 pixels to ±8 pixels.

14. A medical imaging apparatus comprising means for the acquisition of a sequence of digital images, means for the processing of images which has access to the image data of the acquisition system, and which carries out a method which includes temporal and spatial filtering for reducing the noise in an image ($J_t$) comprising:

determination of three temporal intensities ($I_{t-1}$, $I_t$, $I_{t+1}$) relating to a current pixel ($P(x,y)$) in the same location in three successive images ($J_{t-1}$, $J_t$, $J_{t+1}$) in a sequence, determination of three spatial intensities ($M_\alpha$, $M_{\alpha+\pi}$, $MIN(M_\alpha, M_{\alpha+\pi})$) ;

determination of two random pixels ($R_{t-1}$, $R_t$); and spatial and temporal filtering which includes combining (i) inputs of said temporal intensities, (ii) inputs of said spatial intensities, and (iii) at least one input of a spatial and temporal and random intensity to provide a filtered intensity for the current pixel of the processed image ($J_t$), and a display system.

* * * * *